March 11, 1952     C. WELHART     2,589,005
GLASS CONTAINER
Filed Aug. 20, 1949
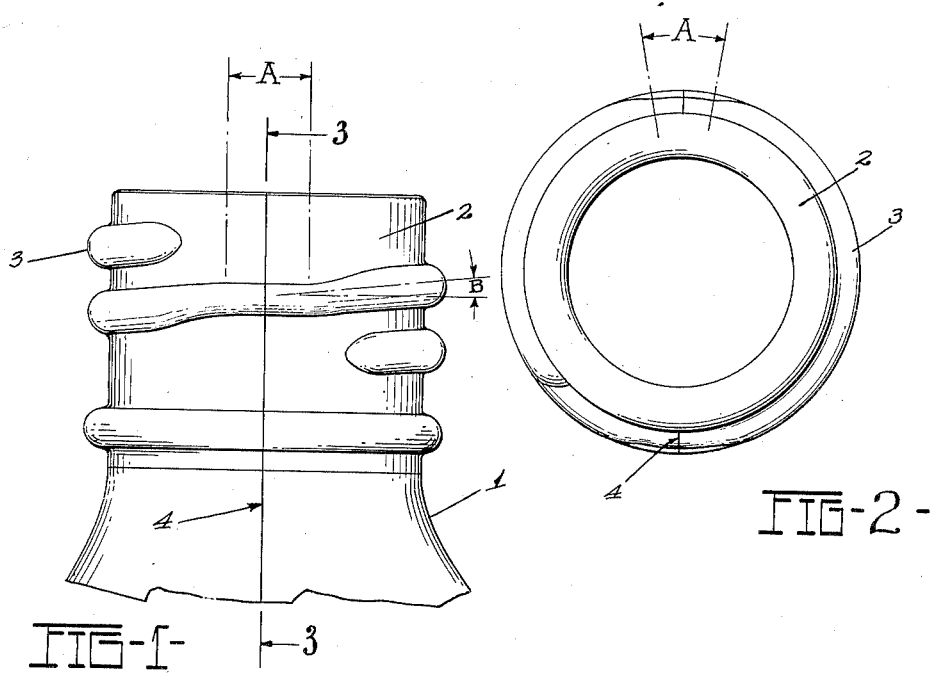
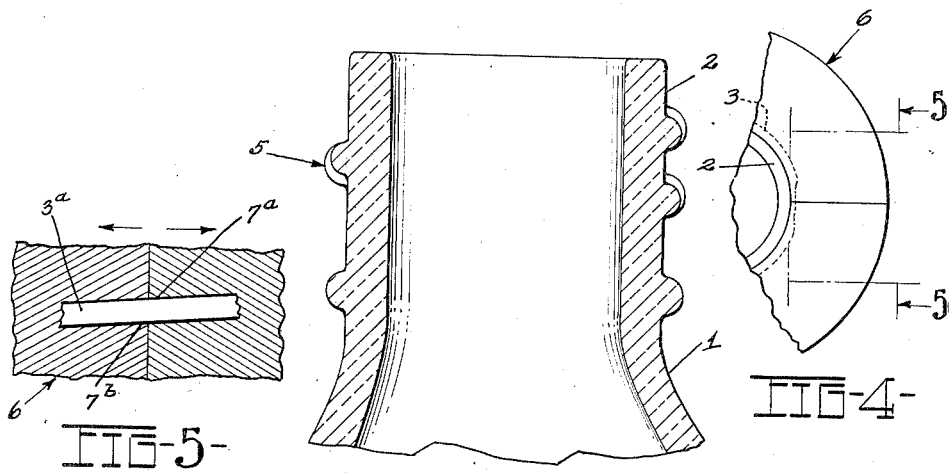
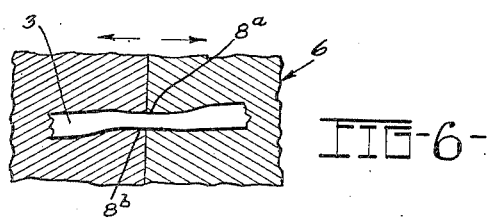
INVENTOR.
CHARLES WELHART
BY
ATTYS.

Patented Mar. 11, 1952

2,589,005

UNITED STATES PATENT OFFICE 2,589,005

GLASS CONTAINER

Charles Welhart, Alton, Ill., assignor to Owens-Illinois Glass Company, a corporation of Ohio Application August 20, 1949, Serial No. 111,479

4 Claims. (Cl. 215—31)

This invention relates to improvements in glass containers having screw-threaded neck portions.

In the production of glass containers in partible molds, there is a tendency for "fins" or ridges to form lengthwise on the exterior surface of the container at the parting line. This condition is also present in the formation of the threads on the neck portion of the container. As the sections of the neck mold separate about a center at one side of the mold, a drag of the metal on the glass takes place in the portion adjacent to the parting line. This occurs because the plane of movement of the sections is not parallel to the helix angle of the thread. The repeated metal-to-glass contact in subsequent operations causes eventual wear of the mold such as necessitates frequent replacement of the mold. In addition, the fins, or sharp edges, which are formed on the container at the parting line, prevent satisfactory engagement with the threaded closure.

Other objectionable results occur when a molded closure formed of a plastic material, such as synthetic resin, or hard rubber composition, is employed. The fins or sharp edges may obstruct application of the molded closure to such an extent that the closure is broken. The sharp edges may also scrape or shave particles of molded closure which particles may eventually reach and contaminate the contents of the container.

In an effort to overcome the objections noted above, interrupted threads have been used. This has proved an unsatisfactory solution, inasmuch as an imperfect and incomplete seal often results. Another suggested remedy has been the depressed thread at the seam, or parting line, such as is disclosed in the Hilgenberg Patent No. 1,866,770. This patent provides for a depressed thread whereby a space is provided between the closure and thread, which accommodates the fins or edges of glass. However, this depressed thread construction does not prevent the wear on the molds and the eventual formation of large fins at the parting line with the consequent scraping and shaving of the closure threads and frequent replacement of the mold. This is because the Hilgenberg patent continues the normal helix angle of the thread into the depressed or dimensionally reduced thread section.

Therefore, it is an objective of my present invention to overcome the objectionable conditions noted above by providing a depressed thread section with a reduced helx angle and cross-sectional dimensions in the portions of the thread at and adjacent to the parting line. In the drawing:

Fig. 1 is a fragmentary elevational view of a section of a glass container employing my improved thread;

Fig. 2 is a plan view thereof;

Fig. 3 is a sectional view taken on line 3—3 of Fig. 1;

Fig. 4 is a partial plan view of a conventional partible neck mold holding a container;

Fig. 5 is a sectional view substantially at the line 5—5 of Fig. 4 but showing a conventional thread; and Fig. 6 is a view similar to Fig. 5 but showing my improved thread.

This invention provides primarily for gradually reducing the cross-sectional dimensions and helix angle of those portions of the thread at and adjacent to the seam or parting line. In its preferred form the invention provides that these portions of the thread have no helix angle.

Referring to Fig. 1, the container is provided with a wall defining a neck portion 2, and a continuous external thread 3 on said neck portion, and a parting line or seam 4. Portions of the thread A adjacent to the seam are reduced in depth and width an amount as indicated by the area 5 in Fig. 3. The helix angle B of the continuous thread 3 is also reduced in the portions A so that there is no helix angle.

The basic construction and principle of operation of the invention can best be illustrated by a comparison with the conventional thread and the depressed thread of Hilgenberg. In the conventional thread or the depressed thread (Fig. 5), as the neck mold 6 separates and begins to open, portions of the mold 7$^a$ and 7$^b$ drag upon the thread 3$^a$. This is obviously a direct result since the plane of movement of the portions of the neck mold is not parallel to the helix angle of the thread. This action results in the formation of fins or sharp edges on the container and in the eventual wearing of the mold. This wearing of the mold increases the size of the fins or sharp edges and the standard dimensions of the container cannot be maintained unless the molds are replaced. Moreover, the fins or sharp edges make application of the closure difficult and may result in breakage of the closure or contamination of the contents if molded closures are used. In the present invention as indicated in Fig. 6, no drag takes place on the portions of the mold 8$^a$ and 8$^b$ since the plane of movement of these portions and the helix angle of the thread are the same. This will apparently eliminate the objectionable conditions which have heretofore been encountered.

I have found that the portions A should preferably extend about ten degrees on either side of the parting line.

Modifications may be resorted to within the spirit and scope of the appended claims.

I claim:

1. A container having circular wall defining a mouth, a continuous screw thread formed exteriorly of said wall for holding engagement with a closure, said thread at diametrically opposed points of the wall having sections reduced in size and extending normal to the axis of the container, said sections being intermediate the ends of the thread.

2. A container having a circular wall defining a mouth, a continuous screw thread formed exteriorly of said wall for holding engagement with a closure, portions of said thread at diametrically opposed points intermediate the ends of the thread being reduced in size and helix angle, said continuous thread having a constant pitch throughout its length, said thread having uniform cross-sectional dimensions and helix angle throughout its length except at said reduced portions, the sections of the thread adjacent to the reduced portions being in alignment.

3. A container having a cylindrical neck with an exterior spiral screw thread formed thereon, the thread having substantially greater length than the circumference of the neck, said thread having diametrically opposite portions of reduced cross-sectional area and reduced helix angle, said reduced portions each being located intermediate the ends of the thread and extending substantially horizontally when the axis of the neck is vertical, the length of each said reduced portion being many times less than the circumference of the neck.

4. The container defined in claim 3, said container being made of glass, the thread being continuous throughout its length, the cross-sectional dimensions and shape of the thread being uniform throughout substantially the entire length of the thread except at said reduced portions, the latter merging into the adjoining portions of the thread.

CHARLES WELHART.

REFERENCES CITED

The following references are of record in the file of this patent:

UNITED STATES PATENTS

| Number | Name | Date |
| --- | --- | --- |
| 1,866,770 | Hilgenberg | July 12, 1932 |
| 2,111,499 | Welhart | Mar. 15, 1938 |
| 2,326,809 | White | Aug. 17, 1943 |